United States Patent
Cazanas et al.

(10) Patent No.: US 8,688,069 B1
(45) Date of Patent: Apr. 1, 2014

(54) MOBILE RADIO WITH INDEPENDENT, USER-OPERATED MESSAGING CHANNEL CARRYING LOCATION INFORMATION

(75) Inventors: Carlos A Cazanas, Bethlehem, PA (US); Azam Khan, Franklin, NJ (US); Matthew Butz, Haslet, TX (US)

(73) Assignee: Cellco Partnership, Basking Ridge, NJ (US)

( * ) Notice: Subject to any disclaimer, the term of this patent is extended or adjusted under 35 U.S.C. 154(b) by 464 days.

(21) Appl. No.: 12/761,847

(22) Filed: Apr. 16, 2010

(51) Int. Cl.
*H04M 11/04* (2006.01)

(52) U.S. Cl.
USPC .......... 455/404.2; 455/412.2; 455/456.1; 455/518

(58) Field of Classification Search
USPC ............ 455/90.2, 90.3, 404.1, 404.2, 455/456.1–457, 466, 517–521, 550.1
See application file for complete search history.

(56) References Cited

U.S. PATENT DOCUMENTS

| | | | | |
|---|---|---|---|---|
| 6,546,232 | B1 * | 4/2003 | Erbel et al. | 455/90.1 |
| 7,353,034 | B2 * | 4/2008 | Haney | 455/457 |
| 7,433,922 | B2 * | 10/2008 | Engstrom | 709/205 |
| 7,634,286 | B2 * | 12/2009 | Dunko | 455/518 |
| 7,711,319 | B2 * | 5/2010 | Namm et al. | 455/11.1 |
| 7,756,539 | B2 * | 7/2010 | Milstein et al. | 455/518 |
| 7,839,811 | B2 * | 11/2010 | Martinez | 370/312 |
| 2003/0207690 | A1 * | 11/2003 | Dorenbosch | 455/445 |
| 2004/0067752 | A1 * | 4/2004 | Himmelstein | 455/422.1 |
| 2008/0140314 | A1 * | 6/2008 | Park | 701/213 |
| 2008/0220728 | A1 * | 9/2008 | Seo | 455/90.2 |
| 2009/0080353 | A1 * | 3/2009 | Zhang et al. | 370/312 |
| 2009/0143056 | A1 * | 6/2009 | Tang et al. | 455/418 |
| 2009/0215424 | A1 | 8/2009 | Petite | |
| 2009/0305660 | A1 | 12/2009 | Liu | |
| 2010/0127853 | A1 * | 5/2010 | Hanson et al. | 340/539.13 |
| 2011/0143651 | A1 * | 6/2011 | Marocchi et al. | 455/3.06 |
| 2011/0165905 | A1 * | 7/2011 | Shuman | 455/518 |

OTHER PUBLICATIONS

U.S. Appl. No. 12/326,674, filed Dec. 2, 2008.

* cited by examiner

*Primary Examiner* — Vladimir Magloire

(57) ABSTRACT

A mobile communication system may include a remote communication system which may transmit communications to and receive communications from a plurality of mobile radios over one or more wireless communication channels. Each mobile radio may include a location sensing system which may sense the location of the mobile radio. A user interface within each mobile radio may receive a request from the user to transmit information indicative of the location of the mobile radio to a remote messaging system. A message transmitter within each mobile radio may transmit the location of the mobile radio sensed by the location sensing system to the remote messaging system in response to the request by the user over a wireless messaging channel. The remote messaging system may aggregate the location information from each mobile radio and deliver this aggregate location information to the remote communication system and/or to the mobile radios.

22 Claims, 3 Drawing Sheets

MOBILE RADIO WITH INDEPENDENT, USER-OPERATED MESSAGING CHANNEL CARRYING LOCATION INFORMATION

BACKGROUND

1. Technical Field

This disclosure relates to communication equipment used by emergency service personnel.

2. Description of Related Art

Police, firemen, and other emergency personnel often need to communicate their location to others, as well as changes in this location. The communication of this information may be needed for their own safety, for the safety of others, and/or for other purposes.

It may be difficult to communication this location information. A police officer, for example, may be in a dangerous situation in which she must remain silent. In other situations, emergency personnel may be injured and unable to speak. In still other situations, the urgency of the situation may prohibit the emergency personnel from taking the time that is needed to determine their location and/or to articulate it to others. Emergency personnel may also already be heavily loaded with equipment. This may make it difficult for them to carry additional devices that might otherwise assist in communicating location information.

Emergency personnel also often work as a team and it may be important for the location of all team members to be known. As indicated above, however, it may be difficult for each team member to provide this location information. It may also be difficult to aggregate this information for a more comprehensive understanding of the team efforts.

SUMMARY

A mobile communication system may include a remote communication system which may transmit communications to and receive communications from a plurality of mobile radios over one or more wireless communication channels.

The wireless communication channels may carry voice communications. The wireless communication channels may be for an emergency service that utilizes multiple service personnel. The emergency service may be law enforcement.

Each mobile radio may include a communication transceiver which may transmit communications to and receive communications from the remote communication system over one of the wireless communication channels. A user interface may receive communications from a user of the mobile radio and deliver them to the communication transceiver for delivery to the remote communication system over one of the wireless communication channels. The user interface may receive communications from the communication transceiver which the communication transceiver receives from the remote communication system over one of the wireless communication channels and deliver them to the user.

The mobile radio may include a location sensing system which may sense the location of the mobile radio. The user interface may receive a request from the user to transmit information indicative of the location of the mobile radio to a remote messaging system. A message transmitter within the mobile radio may transmit the location of the mobile radio that is sensed by the location sensing system to the remote messaging system in response to the request by the user over a wireless messaging channel.

The user interface may include a first user-operated control that is configured when actuated to switch the communication transceiver from a mode that receives communications from the remote communication system to a mode that transmits communications to the remote communication system. A second user-operated control may be configured when actuated to issue the request to transmit information indicative of the location of the mobile radio. The first user-operated control may be the same as or different than the second user-operated control.

Each user-operated control may be a momentary push-button configured to be actuated only while depressed.

The message transmitter may transmit the location when the user-operated control is initially actuated and/or when the user-operated control is released. The message transmitter may periodically transmit the location of the mobile radio following actuation of the user-operated control.

The message transmitter may transmit the location in the form of an SMS text message. The wireless messaging channel may carry SMS text messages.

The remote messaging system may receive location information from a plurality of mobile radios over the wireless messaging channels and aggregate this location information. The remote messaging system may transmit an aggregate location information to the remote communication system and/or to the mobile radios.

The aggregate location information may include information indicative of the location of each mobile radio relative to the other mobile radios. The aggregate location information may include information indicative of the direction that each mobile radio is moving.

The wireless communication channels may be the same as or different than the wireless messaging channels. The remote communication system may be the same as or different than the remote messaging system.

The mobile radio may include a message transceiver of which the message transmitter may be part. The message transceiver may receive from the remote messaging system the aggregate location information. The user interface may receive the aggregate location information from the message transceiver and communicate it to the user. The user interface may be configured to deliver sound or mechanical vibrations to the user which increase in frequency as the mobile radio containing the user interface comes closer to a selected one of the other mobile radios or a target location.

These, as well as other components, steps, features, objects, benefits, and advantages, will now become clear from a review of the following detailed description of illustrative embodiments, the accompanying drawings, and the claims.

BRIEF DESCRIPTION OF DRAWINGS

The drawings disclose illustrative embodiments. They do not set forth all embodiments. Other embodiments may be used in addition or instead. Details that may be apparent or unnecessary may be omitted to save space or for more effective illustration. Conversely, some embodiments may be practiced without all of the details that are disclosed. When the same numeral appears in different drawings, it refers to the same or like components or steps.

DETAILED DESCRIPTION OF ILLUSTRATIVE EMBODIMENTS

Illustrative embodiments are now discussed. Other embodiments may be used in addition or instead. Details that may be apparent or unnecessary may be omitted to save space or for a more effective presentation. Conversely, some embodiments may be practiced without all of the details that are disclosed.

Figure 1:
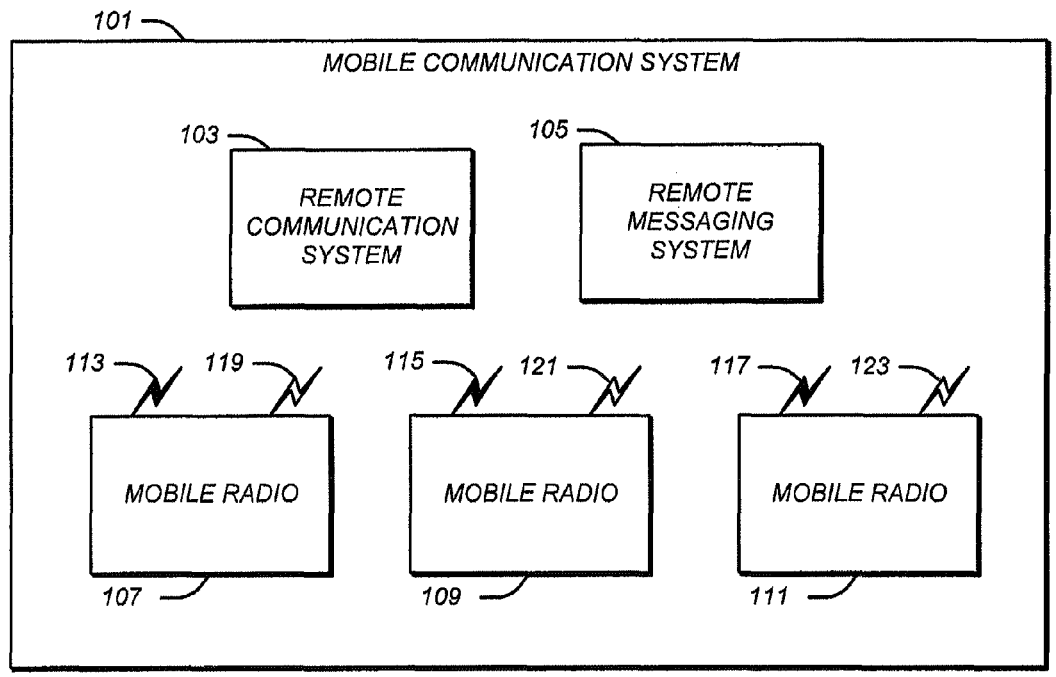
FIG. 1 illustrates a mobile communication system.

FIG. 1 illustrates a mobile communication system 101. As illustrated in FIG. 1, the mobile communication system 101 may include a remote communication system 103, a remote messaging system 105, and one or more mobile radios, such as a mobile radio 107, a mobile radio 109, and a mobile radio 111.

The remote communication system 103 may be configured to transmit communications to and receive communications from a plurality of mobile communication radios, such as the mobile radios 107, 109, and/or 111. The remote communication system 103 may be configured to transmit and/or receive these communications using any form of communication technology, such as VHF and/or UHF land-mobile radio systems.

The remote communication system 103 may be configured to transmit and receive these communications over one or more wireless communication channels, such as over wireless communication channels 113, 115, and 117. The remote communication system 103 may include a single centralized transceiver to manage these wireless communications or a set of transceivers positioned at different locations.

The remote communication system 103 and the associated wireless communication channels 113, 115, and/or 117 may be configured to carry voice communications. For example they might be VHF and/or UHF land-mobile radio systems. These may be dedicated to an emergency service that utilizes multiple service personnel, such as to law enforcement (e.g., a police department), fire control (e.g., a fire department), and/or emergency medical services (e.g., ambulances).

The remote messaging system 105 may be configured to receive location information from the mobile radios, such as from the mobile radios 107, 109, and/or 111. The remote messaging system 105 may be configured to receive this location information over one or more wireless messaging channels, such as wireless messaging channels 119, 121, and 123. The remote messaging system 105 may include a single centralized transceiver to manage this location information from the mobile radios or a set of transceivers positioned at different locations. The remote messaging system 105 may be configured to receive these communications using any form of communication technology, such as Short Message Service (SMS), Session Initiation Protocol (SIP) via IP Multimedia Subsystem (IMS), and/or Real Time Protocol (RTP).

The remote messaging system 105 may be configured to aggregate the location information which it receives from the mobile radios. The remote messaging system 105 may be configured to transmit the aggregate location information to the remote communication system 103 and/or to each of the mobile radios, such as to the mobile radios 107, 109, and/or 111. The aggregate location information may include information indicative of the location of each mobile radio relative to the other mobile radios or to a fixed location. The aggregate location information may include information indicative of the direction that each mobile radio is moving. This direction information may be provided by the mobile radios or may be computed by the remote messaging system 103 based in changes in the location of the mobile radios, as reported by the mobile radios.

The remote messaging system 105 and the associated wireless messaging channels 119, 121, and/or 123 may be configured to receive the location information as SMS text messages, RTP data, and/or SIP Messaging.

The wireless communication channels, such as the wireless communication channels 113, 115, and/or 117, may be the same as or different from the wireless messaging channels, such as the wireless messaging channels 119, 121, and/or 123. Similarly, the remote communication system 103 may be the same as or different from the remote messaging system 105 and/or may be located at the same or at different locations.

Figure 2:
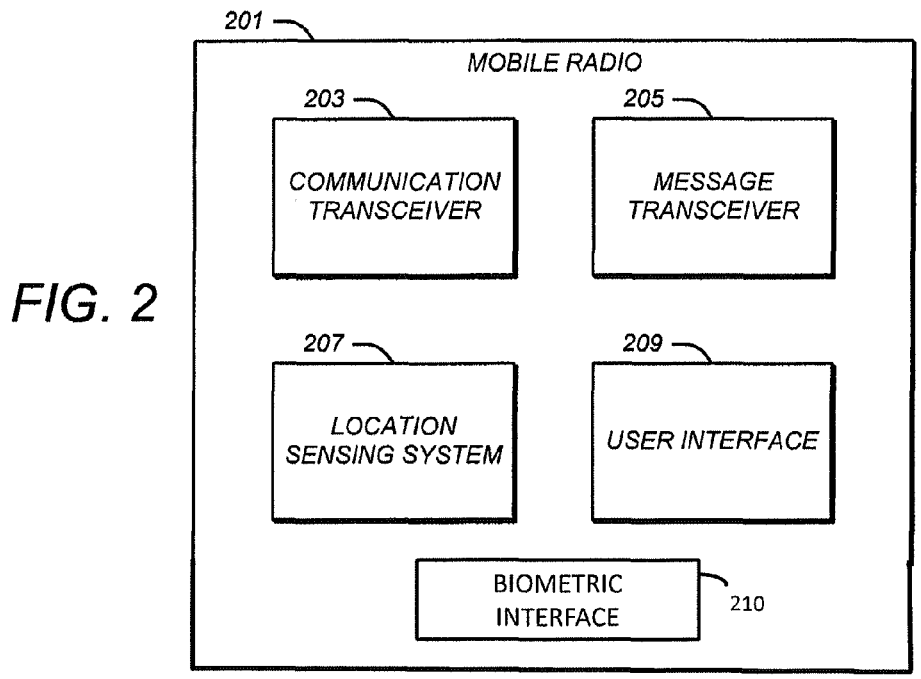
FIG. 2 illustrates a mobile radio.

FIG. 2 illustrates a mobile radio 201. The mobile radio 201 may be used as the mobile radios 107, 109, and/or 111 in FIG. 1 or in connection with any other type of mobile communication system. Similarly, the mobile radios 107, 109, and/or 111 may be different than the mobile radio 201.

The mobile radio 201 may include a communication transceiver 203, a message transceiver 205, a location sensing system 207, and a user interface 209.

The communication transceiver 203 may be configured to transmit communications to and to receive communications from a remote communication system, such as the remote communication system 103 illustrated in FIG. 1, over a wireless communication channel, such as the wireless communication channel 113 illustrated in FIG. 1. The communication transceiver 203 may be configured to transmit and receive communications in any format, such as voice, video, text, and/or a combination of these. The communications may be in digital and/or analog format.

The location sensing system 207 may be configured to sense the location of the mobile radio 201. The location sensing system 207 may include any type components configured to perform this function. For example, the location sensing system 207 may include a GPS chip and/or may use triangulation in connection with multiple base stations with which the communication transceiver 203 and/or the message transceiver 205 communicate.

The user interface 209 may be configured to receive communications from a user of the mobile radio 201 and to deliver these to the communication transceiver 203 for delivery to the remote communication system over the wireless communication channel. The user interface 209 may correspondingly be configured to receive communications from the communication transceiver 203 which the communication transceiver receives from the remote communication system over the wireless communication channel and to deliver them to the user.

The message transceiver 205 may include a message transmitter configured to transmit the location of the mobile radio 201 as sensed by the location sensing system 207 to the remote messaging system over the wireless messaging channel. It may be configured to do so in response to a request from the user to transmit such information which is received by the user interface 209 The message transceiver 205 may be configured to transmit the location in any form, such as in the form of an SMS text message, RTP data. and/or SIP Messaging. The message transceiver 205 may be configured to transmit the location using any communication technology, such as Short Message Service (SMS), Session Initiation Protocol (SIP) via IP Multimedia Subsystem (IMS), and/or Real Time Protocol (RTP).

The message transceiver 205 may be configured to receive the aggregate location information from the remote messaging system. The message transceiver may be configured to do so using any communication technology, such as Short Message Service (SMS), Session Initiation Protocol (SIP) via IP Multimedia Subsystem (IMS), and/or Real Time Protocol (RTP). The user interface 209 may be configured to receive the aggregate location information from the message transceiver 205 and to communicate it to the user. The user interface may use a graphical interface (GUI) for this purpose. The graphical interface may be co-located with the mobile radio or separate from the mobile radio. As an example the GUI may be tied to the users forearm for easier reading.

The user interface 209 may be configured to deliver sound or mechanical vibrations to the user which may increase in frequency as the mobile radio 201 comes closer to a selected one of the other mobile radios that are part of a mobile communication system or to a fixed location. The increase in frequency may be implemented by an increase in the frequency of the sound or mechanical vibrations and/or by an increase in the frequency of spaced pulses of this sound and/or mechanical vibrations.

The message transceiver 205 may be configured to receive information indicative of the direction of movement of each of the mobile radios from the remote messaging system 105. The user interface 209 may be configured to communicate this direction of movement information to the user.

Figure 3:
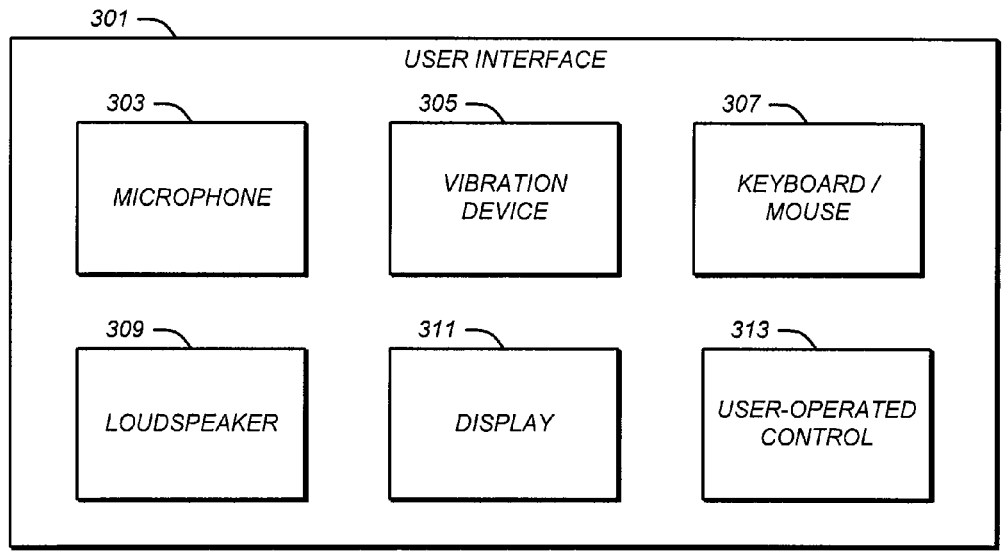
FIG. 3 illustrates a user interface.

FIG. 3 illustrates a user interface 301. The user interface 301 may be used as the user interface 209 illustrated in FIG. 2 or in connection with any other type of mobile radio. Similarly, the user interface 209 may be different than the user interface 301.

The user interface 301 may include a microphone 303, a vibration device 305, a keyboard and/or mouse 307, a loudspeaker 309, a display 311, a user-operated control 313, and/or any other type of user interface device.

The microphone 303 may be configured to receive voice communications from a user and to deliver them to the communication transceiver 203 for delivery to the remote communication system 103.

The vibration device 305 may be configured to deliver mechanical vibrations to the user which may increase in frequency as the mobile radio containing the user interface gets closer to a selected one of the other mobile radios within the mobile communication system or to a fixed location. The increase in frequency may be implemented by an increase in the frequency of the mechanical vibrations and/or by an increase in the frequency of spaced pulses of these mechanical vibrations.

The loudspeaker 309 may be configured to deliver communications received by the communication transceiver 203 to the user. The loudspeaker 309 may also or instead be used to deliver a tone to the user which may increase in frequency as the mobile radio 201 comes closer to a selected one of the other mobile radios that are part of a mobile communication system or to a fixed location. The increase in frequency may be implemented by an increase in the frequency of the tone and/or by an increase in the frequency of spaced pulses of this tone.

The user-operated control 313 may be part of or different from the keyboard and/or mouse 307. When actuated, the user-operated control 313 may be configured to switch the communication transceiver 203 from a mode which receives communications from the remote communication system 103 to a mode that transmits communications to the remote communication system. When actuated, the user-operated control 313 may also be configured to issue a request to transmit information indicative of the location of the mobile communication radio in which the user interface 301 is used.

The user-operated control 313 may be of any type. For example, the user-operated control 313 may be a momentary push-button configured to be actuated only while depressed.

The display 311 may be used to communicate information to the user, such as information relating to communications received by the communication transceiver 203 and/or the message transceiver 205.

The message transmitter which may be part of the message transceiver 205 may be configured to transmit the location of the mobile radio 201 when the user-operated control 313 is initially actuated, when it is released, and/or at any time in between. The message transmitter may be configured to repeatedly transmit the location of the mobile radio following the request from the user to transmit this information, such as following the actuation of the user-operated control 313. The updates may be periodic, such as once every minute, and/or may take place each time there are changes in the location of the mobile radio or each time these location changes exceed a threshold distance.

Figure 4:
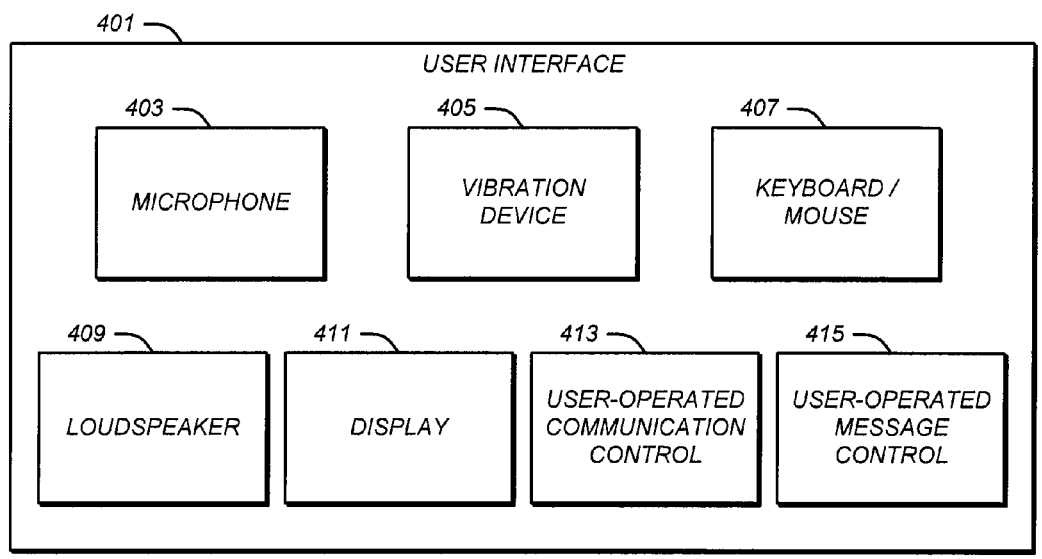
FIG. 4 illustrates another example of a user interface.

FIG. 4 illustrates another example of a user interface 401. The user interface 401 may be used as the user interface 209 or in connection with a different mobile radio. Similarly, the user interface 209 may be different than the user interface 401.

The user interface 401 may include a microphone 403, a vibrating device 405, a keyboard and/or mouse 407, a loudspeaker 409, a display 411, a user-operated communication control 413, and a user-operated message control 415.

The various components for the user interface 401 may be the same as the corresponding components for the user interface 301, except in connection with the user-operated control 313. Instead, the functions provided by the user-operated control 313 may be divided between two user-operated controls, the user-operated communication control 413 and the user-operated message control 415. Specifically, the user-operated communication control 413 may be configured, when actuated, to switch the communication transceiver 203 from the mode that receives communications from the remote communication system 103 to the mode that transmits communications to the remote communication system 103. The user-operated message control 415 may be configured, when actuated, to issue the request to transmit information indicative of the location of the mobile radio 201.

Figure 5:
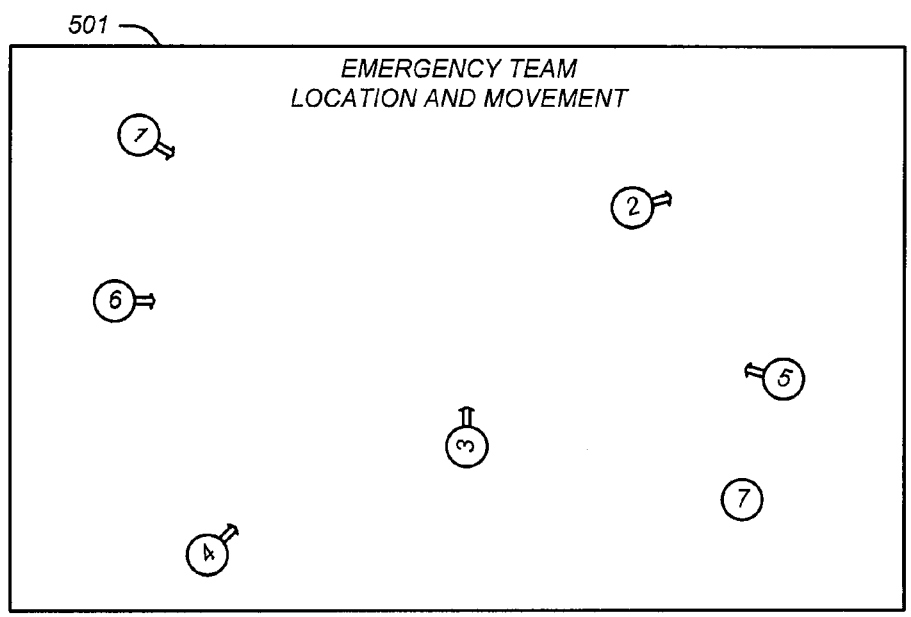
FIG. 5 illustrates a display of the location and movement of an emergency team.

FIG. 5 illustrates a display 501 of the location and movement of an emergency team. The display 501 may be used as the display 311, the display 411, and/or in connection with any other type of user interface. Similarly, the displays 311 and/or 411 may be different than the display 501.

The display 501 may display the location and direction of movement of each member of a team, such as an emergency team, that is carrying a mobile radio of the type illustrated in FIG. 2 and that has caused information about its location to be transmitted to the remote messaging system 105. The display 501 may also display the direction in which each mobile radio is moving. If a mobile radio is not moving, information indicative of this non-movement may also be displayed.

Any type of visual information may be displayed in the display 501 to communicate this location information. For example, and as illustrated in FIG. 5, each member of the team may be designated by indicia identifying the team member. This indicia may consist of or include a number assigned to the team member, such as "1," "2," "3," "4," "5," "6," and "7," as illustrated in FIG. 5. The indicia may in addition or instead include the name of the team member, the function of the team member, the position of the team member, a photograph of the team member, and/or any other type of identifying information.

The display may represent and/or include a two dimensional geographic map. As also illustrated in FIG. 5, the information identifying each team member may be positioned on the map at his/her location, as reported by his/her mobile radio. The location of the person carrying the mobile radio which includes the display 501 may or may not be included on the map. The map may be centered around the location of the person carrying the mobile radio which includes the display 501 or around any other point.

Any type of visual indicia may be displayed in the display 501 to indicate the direction of movement of each team member. For example, an arrow may be attached to the information identifying the team member pointing to the direction of that movement, as illustrated in FIG. 5.

The components, steps, features, objects, benefits and advantages that have been discussed are merely illustrative. None of them, nor the discussions relating to them, are intended to limit the scope of protection in any way. Numerous other embodiments are also contemplated. These include embodiments that have fewer, additional, and/or different components, steps, features, objects, benefits and advantages. These also include embodiments in which the components and/or steps are arranged and/or ordered differently.

For example, biometric feedback from the user may be incorporated into the SMS payload data. The system may include biometric interfaces 210 (shown in FIG. 2) attached to the police personnel and may upload biometric feedback data provided via the biometric interfaces to the remote messaging system 105. Pulse rate and blood pressure (BP) may be of great diagnostic aid to the user and to the central authority responding to any injury that an officer/user may be exposed to during a chase/incident. The application on the police radio may sense the drop in BP or pulse rate via the biometric interface 210 and send distress messages to the central authority with location information and the pulse BP readings in an effort to reach injured personnel. Utilizing a method of "tagging," a person/persons (assailant) being chased may be tracked via a disbursable agent/RFID type device attached to the assailant which is configured to transmit/beacon the location of the 'assailant' to the police.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

All articles, patents, patent applications, and other publications which have been cited in this disclosure are hereby incorporated herein by reference.

The phrase "means for" when used in a claim is intended to and should be interpreted to embrace the corresponding structures and materials that have been described and their equivalents. Similarly, the phrase "step for" when used in a claim is intended to and should be interpreted to embrace the corresponding acts that have been described and their equivalents. The absence of these phrases in a claim mean that the claim is not intended to and should not be interpreted to be limited to any of the corresponding structures, materials, or acts or to their equivalents.

Nothing that has been stated or illustrated is intended or should be interpreted to cause a dedication of any component, step, feature, object, benefit, advantage, or equivalent to the public, regardless of whether it is recited in the claims.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents.

The invention claimed is:

1. A mobile communication system comprising:
    a remote communication system configured to transmit communications to and receive communications from a plurality of mobile radios over one or more wireless communication channels that are dedicated to an emergency service;
    a remote messaging system configured to receive location information from a plurality of mobile radios over one or more wireless messaging channels, different from the wireless communications channels, and to aggregate this location information;
    a plurality of mobile radios, each comprising:
        a communication transceiver configured to transmit communications to and receive communications from the remote communication system over one of the wireless communication channels;
        a biometric interface configured to receive biometric feedback diagnostic data of a user of the mobile radio;
        a location sensing system configured to sense the location of the mobile radio;
        a user interface configured to:
            receive communications from a user of the mobile radio and deliver them to the communication transceiver for delivery to the remote communication system over one of the wireless communication channels;
            receive communications from the communication transceiver, which the communication transceiver receives from the remote communication system over one of the wireless communication channels, and deliver them to the user; and
            receive a request from the user to transmit information indicative of the location of the mobile radio to the remote messaging system; and
        a message transmitter, separate from the communications transceiver, configured to transmit the location of the mobile radio sensed by the location sensing system and the received biometric feedback diagnostic data to the remote messaging system, over one of the wireless messaging channels, in response to the request by the user.

2. The mobile communication system of claim 1 wherein:
    each wireless communication channel is configured to carry voice communications;
    each wireless messaging channel is configured to carry SMS text messages; and
    each message transmitter is configured to transmit the location in the form of an SMS text message.

3. The mobile communication system of claim 1 wherein the remote messaging system is configured to transmit the aggregate location information to the remote communication system.

4. The mobile communication system of claim 1 wherein:
    the remote messaging system is configured to transmit the aggregate location information to each of the mobile radios; and
    each user interface is configured to communicate the aggregate location information to the user in a single display.

5. The mobile communication system of claim 1 wherein the aggregate location information includes information indicative of the location of each mobile radio relative to the other mobile radios and the motion component.

6. A mobile radio comprising:
    a communication transceiver configured to transmit communications to and receive communications from a remote communication system over a wireless communication channel that is dedicated to an emergency service;

a biometric interface configured to receive biometric feedback diagnostic data of a user of the mobile radio;

a location sensing system configured to sense the location of the mobile radio;

a user interface configured to:

receive communications from a user of the mobile radio and deliver them to the communication transceiver for delivery to the remote communication system over the wireless communication channel;

receive communications from the communication transceiver which the communication transceiver receives from the remote communication system over the wireless communication channel and deliver them to the user; and receive a request from the user to transmit information indicative of the location of the mobile radio to a remote messaging system;

a message transmitter, separate from the communications transceiver and configured to transmit the location of the mobile radio sensed by the location sensing system and the received biometric feedback diagnostic data, over a wireless messaging channel, different from the wireless communications channel, to the remote messaging system in response to the request from the user; and a message receiver configured to receive aggregate location information from a remote messaging system over the wireless messaging channel.

7. The mobile radio of claim 6 wherein:

the wireless communication channel is configured to carry voice communications;

the wireless messaging channel is configured to carry SMS text messages; and the message transmitter is configured to transmit the location in the form of an SMS text message.

8. The mobile radio of claim 6 wherein the wireless communication channel is for an emergency service that utilizes multiple service personnel.

9. The mobile radio of claim 8 wherein the emergency service is law enforcement.

10. The mobile radio of claim 6 wherein the user interface includes:

a first user-operated control that is configured when actuated to switch the communication transceiver from a mode that receives communications from the remote communication system to a mode that transmits communications to the remote communication system; and a second user-operated control that is configured when actuated to issue the request to transmit information indicative of the location of the mobile radio.

11. The mobile radio of claim 10 wherein the first user-operated control is different than the second user-operated control.

12. The mobile radio of claim 10 wherein the first user-operated control is the same as the second user operated control.

13. The mobile radio of claim 12 wherein the user-operated control is a momentary push-button configured to be actuated only while depressed.

14. The mobile radio of claim 13 wherein the message transmitter is configured to transmit the location when the user-operated control is initially actuated.

15. The mobile radio of claim 13 wherein the message transmitter is configured to transmit the location when the user-operated control is released.

16. The mobile radio of claim 6 wherein the message transmitter is configured to periodically transmit the location of the mobile radio following the request from the user to transmit.

17. The mobile radio of claim 6 wherein:

the user interface is configured to communicate the direction of movement of the other mobile radios to the user as a map showing the location of each of the other mobile radios relative to the user.

18. The mobile radio of claim 17 wherein:

the user interface is configured to communicate the direction of movement of the other radios to the users via arrows superimposed on the map.

19. The system of claim 1, wherein the message transmitter is further configured to transmit, responsive to the biometric feedback data indicating an injury, the location of the mobile radio sensed by the location sensing system and the received biometric feedback data.

20. The mobile radio of claim 6, wherein the message transmitter is further configured to transmit, responsive to the biometric feedback data indicating an injury, the location of the mobile radio sensed by the location sensing system and the received biometric feedback data.

21. The system of claim 1, wherein the message transmitter is configured to transmit the location and the received biometric feedback diagnostic data in a single message over the wireless messaging channel, wherein the message is selected from a group consisting of a short messaging service (SMS) message, a session initiation protocol (SIP) message, an Internet protocol (IP) multimedia subsystem (IMS) message and a real time protocol (RTP) message.

22. The mobile radio of claim 6, wherein the message transmitter is configured to transmit the location and the received biometric feedback diagnostic data in a single message over the wireless messaging channel, wherein the message is selected from a group consisting of a short messaging service (SMS) message, a session initiation protocol (SIP) message, an Internet protocol (IP) multimedia subsystem (IMS) message and a real time protocol (RTP) message.

* * * * *